US010061946B2

(12) United States Patent
Nadabar et al.

(10) Patent No.: US 10,061,946 B2
(45) Date of Patent: Aug. 28, 2018

(54) METHOD AND APPARATUS FOR INDUSTRIAL IDENTIFICATION MARK VERIFICATION

(71) Applicant: COGNEX TECHNOLOGY AND INVESTMENT LLC, Natick, MA (US)

(72) Inventors: Sateesha Nadabar, Framingham, MA (US); Carl W. Gerst, III, Sherborn, MA (US)

( * ) Notice: Subject to any disclaimer, the term of this patent is extended or adjusted under 35 U.S.C. 154(b) by 0 days.

(21) Appl. No.: 15/397,867

(22) Filed: Jan. 4, 2017

(65) Prior Publication Data

US 2017/0235977 A1  Aug. 17, 2017

Related U.S. Application Data

(63) Continuation of application No. 11/021,098, filed on Dec. 23, 2004, now Pat. No. 9,552,506.

(51) Int. Cl.
| | |
|---|---|
| *G06K 7/10* | (2006.01) |
| *G08C 21/00* | (2006.01) |
| *G06K 5/00* | (2006.01) |
| *G06K 19/06* | (2006.01) |
| *G06K 7/14* | (2006.01) |
| *G06K 9/03* | (2006.01) |

(52) U.S. Cl.
CPC ............. *G06K 5/00* (2013.01); *G06K 7/1417* (2013.01); *G06K 7/1447* (2013.01); *G06K 9/036* (2013.01); *G06K 19/06037* (2013.01)

(58) Field of Classification Search
CPC ........... G06K 7/10732; G06K 7/10851; G06K 7/10881; G06K 7/10722; G06K 7/10831; G06K 7/10712; G06K 7/10801; G06K 7/10683; G06K 7/14; G06K 2207/1012; G06K 19/06037; G06K 7/0004; G06K 7/089; G06K 7/1404; G06K 7/1417; G06K 7/1075
See application file for complete search history.

(56) References Cited

U.S. PATENT DOCUMENTS

| | | | |
|---|---|---|---|
| 3,868,634 | A | 2/1975 | Dolch |
| 3,890,597 | A | 6/1975 | Hanchett |
| 4,282,425 | A | 8/1981 | Chadima, Jr. et al. |
| 4,308,455 | A | 12/1981 | Bullis et al. |

(Continued)

FOREIGN PATENT DOCUMENTS

| | | |
|---|---|---|
| DE | 10012715 A1 | 9/2000 |
| EP | 0571892 A2 | 12/1993 |

(Continued)

OTHER PUBLICATIONS

US 6,768,414, 07/2004, Francis (withdrawn)

(Continued)

*Primary Examiner* — Thien T Mai
(74) *Attorney, Agent, or Firm* — Quarles & Brady LLP

(57) ABSTRACT

The invention provides methods and apparatus for analysis of images of direct part mark identification codes to measure and assess a print quality. Methods to assess the quality of a direct part mark identification code are presented that provide diagnostic information of a code that cannot be assessed using verification methods that require the results of a valid decoding step.

20 Claims, 3 Drawing Sheets

(56) References Cited

U.S. PATENT DOCUMENTS

| | | |
|---|---|---|
| 4,408,344 A | 10/1983 | McWaters et al. |
| 4,421,978 A | 12/1983 | Laurer et al. |
| 4,542,548 A | 9/1985 | Marazzini |
| 4,782,220 A | 11/1988 | Shuren |
| 4,866,784 A | 9/1989 | Barski |
| 4,894,523 A | 1/1990 | Chadima, Jr. et al. |
| 4,948,955 A | 8/1990 | Lee et al. |
| 4,973,829 A | 11/1990 | Ishida et al. |
| 5,028,772 A | 7/1991 | Lapinski et al. |
| 5,053,609 A | 10/1991 | Priddy et al. |
| 5,120,940 A | 6/1992 | Willsie |
| 5,124,537 A | 6/1992 | Chandler et al. |
| 5,124,538 A | 6/1992 | Lapinski et al. |
| 5,155,343 A | 10/1992 | Chandler et al. |
| 5,163,104 A | 11/1992 | Ghosh et al. |
| 5,166,830 A | 11/1992 | Ishibai et al. |
| 5,187,355 A | 2/1993 | Chadima, Jr. et al. |
| 5,187,356 A | 2/1993 | Chadima, Jr. et al. |
| 5,192,856 A | 3/1993 | Schaham |
| 5,198,650 A | 3/1993 | Wike, Jr. |
| 5,262,623 A | 11/1993 | Batterman et al. |
| 5,262,625 A | 11/1993 | Tom et al. |
| 5,262,626 A | 11/1993 | Goren et al. |
| 5,262,652 A | 11/1993 | Bright et al. |
| 5,276,315 A | 1/1994 | Surka |
| 5,276,316 A | 1/1994 | Blanford |
| 5,278,397 A | 1/1994 | Barkan et al. |
| 5,286,960 A | 2/1994 | Longacre, Jr. et al. |
| 5,291,008 A | 3/1994 | Havens et al. |
| 5,296,690 A | 3/1994 | Chandler et al. |
| 5,304,786 A | 4/1994 | Pavlidis et al. |
| 5,304,787 A | 4/1994 | Wang |
| 5,332,892 A | 7/1994 | Li et al. |
| 5,378,883 A | 1/1995 | Batterman et al. |
| 5,412,197 A | 5/1995 | Smith |
| 5,418,862 A | 5/1995 | Zheng et al. |
| 5,420,409 A | 5/1995 | Longacre et al. |
| 5,428,212 A | 6/1995 | Tani et al. |
| 5,446,271 A | 8/1995 | Cherry et al. |
| 5,455,414 A | 10/1995 | Wang |
| 5,461,417 A | 10/1995 | White et al. |
| 5,463,214 A | 10/1995 | Longacre, Jr. et al. |
| 5,478,999 A | 12/1995 | Figarella et al. |
| 5,481,098 A | 1/1996 | Davis et al. |
| 5,483,051 A | 1/1996 | Marchi |
| 5,486,689 A | 1/1996 | Ackley |
| 5,487,115 A | 1/1996 | Surka |
| 5,507,527 A | 4/1996 | Tomioka et al. |
| 5,510,603 A | 4/1996 | Hess et al. |
| 5,514,858 A | 5/1996 | Ackley |
| 5,523,552 A | 6/1996 | Shellhammer et al. |
| 5,539,191 A | 7/1996 | Ackley |
| 5,550,366 A | 8/1996 | Roustaei |
| 5,557,091 A | 9/1996 | Krummel |
| 5,591,956 A | 1/1997 | Longacre, Jr. et al. |
| 5,612,524 A | 3/1997 | Sant'Anselmo et al. |
| 5,627,358 A | 5/1997 | Roustaei |
| 5,635,699 A | 6/1997 | Cherry et al. |
| 5,646,391 A | 7/1997 | Forbes et al. |
| 5,657,402 A | 8/1997 | Bender et al. |
| 5,675,137 A | 10/1997 | Van Haagen et al. |
| 5,682,030 A | 10/1997 | Kubon |
| 5,691,527 A | 11/1997 | Hara et al. |
| 5,691,597 A | 11/1997 | Nishimura et al. |
| 5,723,853 A | 3/1998 | Longacre, Jr. et al. |
| 5,739,518 A | 4/1998 | Wang |
| 5,742,037 A | 4/1998 | Scola et al. |
| 5,744,790 A | 4/1998 | Li |
| 5,756,981 A | 5/1998 | Roustaei et al. |
| 5,767,497 A | 6/1998 | Lei |
| 5,767,498 A | 6/1998 | Heske, III et al. |
| 5,777,309 A | 7/1998 | Maltsev et al. |
| 5,780,834 A | 7/1998 | Havens et al. |
| 5,786,586 A | 7/1998 | Pidhirny et al. |
| 5,811,784 A | 9/1998 | Tausch et al. |
| 5,814,827 A | 9/1998 | Katz |
| 5,821,520 A | 10/1998 | Mulla et al. |
| 5,825,006 A | 10/1998 | Longacre, Jr. et al. |
| 5,852,288 A | 12/1998 | Nakazawa et al. |
| 5,872,354 A | 2/1999 | Hanson |
| 5,877,486 A | 3/1999 | Maltsev et al. |
| 5,880,451 A | 3/1999 | Smith et al. |
| 5,889,270 A | 3/1999 | Van Haagen et al. |
| 5,902,988 A | 5/1999 | Durbin |
| 5,914,476 A | 6/1999 | Gerst, III et al. |
| 5,920,060 A | 7/1999 | Marom |
| 5,929,418 A | 7/1999 | Ehrhart et al. |
| 5,932,862 A | 8/1999 | Hussey et al. |
| 5,936,224 A | 8/1999 | Shimizu et al. |
| 5,949,052 A | 9/1999 | Longacre, Jr. et al. |
| 5,992,744 A | 11/1999 | Smith et al. |
| 6,000,612 A | 12/1999 | Xu |
| 6,006,990 A | 12/1999 | Ye et al. |
| 6,021,380 A | 2/2000 | Fredriksen et al. |
| 6,021,946 A | 2/2000 | Hippenmeyer et al. |
| 6,053,407 A | 4/2000 | Wang et al. |
| 6,056,198 A | 5/2000 | Rudeen et al. |
| 6,075,883 A | 6/2000 | Stern et al. |
| 6,075,905 A | 6/2000 | Herman et al. |
| 6,078,251 A | 6/2000 | Landt et al. |
| 6,082,619 A | 7/2000 | Ma et al. |
| 6,088,482 A | 7/2000 | He et al. |
| 6,095,422 A | 8/2000 | Ogami |
| 6,123,261 A | 9/2000 | Roustaei |
| 6,141,033 A | 10/2000 | Michael et al. |
| 6,152,371 A | 11/2000 | Schwartz et al. |
| 6,158,661 A | 12/2000 | Chadima, Jr. et al. |
| 6,161,760 A | 12/2000 | Marrs |
| 6,176,428 B1 | 1/2001 | Joseph et al. |
| 6,189,792 B1 | 2/2001 | Heske, III |
| 6,206,289 B1 | 3/2001 | Shame et al. |
| 6,209,789 B1 | 4/2001 | Amundsen et al. |
| 6,234,395 B1 | 5/2001 | Chadima, Jr. et al. |
| 6,234,397 B1 | 5/2001 | He et al. |
| 6,250,551 B1 | 6/2001 | He et al. |
| 6,289,113 B1 | 9/2001 | McHugh et al. |
| 6,298,176 B2 | 10/2001 | Longacre, Jr. et al. |
| 6,334,060 B1 | 12/2001 | Sham et al. |
| 6,340,119 B2 | 1/2002 | He et al. |
| 6,371,373 B1 | 4/2002 | Ma et al. |
| 6,398,113 B1 | 6/2002 | Heske, III |
| 6,405,925 B2 | 6/2002 | He et al. |
| 6,408,429 B1 | 6/2002 | Marrion et al. |
| 6,446,868 B1 | 9/2002 | Robertson et al. |
| 6,454,168 B1 | 9/2002 | Brandt et al. |
| 6,490,376 B1 | 12/2002 | Au et al. |
| 6,491,223 B1 | 12/2002 | Longacre, Jr. et al. |
| 6,505,778 B1 | 1/2003 | Reddersen et al. |
| 6,512,714 B2 | 1/2003 | Hanzawa et al. |
| 6,513,714 B1 | 2/2003 | Davis et al. |
| 6,513,715 B2 | 2/2003 | Heske, III |
| 6,561,427 B2 | 5/2003 | Davis et al. |
| 6,629,642 B1 | 10/2003 | Swartz et al. |
| 6,677,852 B1 | 1/2004 | Landt |
| 6,681,151 B1 | 1/2004 | Weinzimmer et al. |
| 6,698,656 B2 | 3/2004 | Parker et al. |
| 6,728,419 B1 | 4/2004 | Young |
| 6,761,316 B2 | 7/2004 | Bridgelall |
| 6,765,606 B1 | 7/2004 | Iddan et al. |
| 6,816,063 B2 | 11/2004 | Kubler |
| 6,913,199 B2 | 7/2005 | He |
| 6,919,793 B2 | 7/2005 | Heinrich |
| 7,044,378 B2 | 5/2006 | Patel et al. |
| 7,059,525 B2 | 6/2006 | Longacre et al. |
| 7,061,524 B2 | 6/2006 | Liu et al. |
| 7,066,388 B2 | 6/2006 | He |
| 7,070,099 B2 | 7/2006 | Patel |
| 7,108,184 B2 | 9/2006 | Mase et al. |
| 7,121,467 B2 | 10/2006 | Winter |
| 7,175,090 B2 | 2/2007 | Nadabar |
| 7,181,066 B1 | 2/2007 | Wagman |
| 7,213,759 B2 | 5/2007 | Reichenbach et al. |
| 7,219,841 B2 | 5/2007 | Biss |
| 7,227,628 B1 | 6/2007 | Sullivan et al. |

(56) References Cited

U.S. PATENT DOCUMENTS

| | | |
|---|---|---|
| 7,460,130 B2 | 12/2008 | Salganidoff |
| 7,498,566 B2 | 3/2009 | Kasper et al. |
| 7,604,174 B2 | 10/2009 | Gerst et al. |
| 7,609,846 B2 | 10/2009 | Smith et al. |
| 7,614,554 B2 | 11/2009 | Mott et al. |
| 7,774,075 B2 | 8/2010 | Lin et al. |
| 8,737,721 B2 | 5/2014 | Arcas et al. |
| 8,858,856 B2 | 10/2014 | Kozlak |
| 2001/0042065 A1 | 11/2001 | Yoshihiro et al. |
| 2001/0042789 A1 | 11/2001 | Krichever et al. |
| 2002/0044689 A1 | 4/2002 | Roustaei et al. |
| 2002/0171745 A1 | 11/2002 | Ehrhart |
| 2003/0006290 A1* | 1/2003 | Hussey ............ G06K 7/10851 235/472.01 |
| 2003/0062418 A1 | 4/2003 | Barber et al. |
| 2003/0090586 A1 | 5/2003 | Jan et al. |
| 2003/0117511 A1 | 6/2003 | Belz et al. |
| 2003/0121978 A1 | 7/2003 | Rubin et al. |
| 2003/0195749 A1 | 10/2003 | Schuller |
| 2003/0201328 A1 | 10/2003 | Jam et al. |
| 2004/0020990 A1 | 2/2004 | Havens et al. |
| 2004/0026508 A1* | 2/2004 | Nakajima ................ G06K 7/14 235/454 |
| 2004/0091255 A1 | 5/2004 | Chase et al. |
| 2005/0180804 A1* | 8/2005 | Andrew .................. G06K 5/02 400/703 |
| 2005/0194447 A1 | 9/2005 | He et al. |
| 2005/0263599 A1 | 12/2005 | Zhu et al. |
| 2005/0275831 A1 | 12/2005 | Silver |
| 2005/0275897 A1 | 12/2005 | Fan et al. |
| 2006/0022052 A1 | 2/2006 | Patel et al. |
| 2006/0027657 A1 | 2/2006 | Ninnink et al. |
| 2006/0027661 A1 | 2/2006 | Hosoi et al. |
| 2006/0050961 A1 | 3/2006 | Thiyagarajah |
| 2006/0131418 A1 | 6/2006 | Testa |
| 2006/0131419 A1 | 6/2006 | Nunnink |
| 2006/0132787 A1 | 6/2006 | Mestha et al. |
| 2006/0133757 A1 | 6/2006 | Nunnink |
| 2006/0249581 A1 | 11/2006 | Smith et al. |
| 2006/0283952 A1 | 12/2006 | Wang |
| 2006/0285135 A1 | 12/2006 | Mestha et al. |
| 2007/0181692 A1 | 8/2007 | Barkan et al. |
| 2008/0004822 A1 | 1/2008 | Nadabar et al. |
| 2008/0011855 A1 | 1/2008 | Nadabar |
| 2008/0019615 A1 | 1/2008 | Schnee et al. |
| 2008/0143838 A1 | 6/2008 | Nadabar |
| 2009/0090781 A1 | 4/2009 | Ye et al. |
| 2009/0121027 A1 | 5/2009 | Nadabar |

FOREIGN PATENT DOCUMENTS

| | | |
|---|---|---|
| EP | 0896290 A2 | 2/1999 |
| EP | 1469420 A2 | 10/2004 |
| EP | 1975849 A1 | 10/2008 |
| JP | H1040327 A | 2/1998 |
| JP | 2005276119 A | 10/2005 |
| WO | 9613797 A2 | 5/1996 |
| WO | 0215120 A1 | 2/2002 |
| WO | 02075637 A1 | 9/2002 |
| WO | 2006052884 A1 | 5/2006 |
| WO | 2008118419 A1 | 10/2008 |
| WO | 2008118425 A1 | 10/2008 |

OTHER PUBLICATIONS http://www.merriam-webster.com/dictionary/optimal, Oct. 27, 2008, 1 page.

Automatic I.D. News, Serving Users of Optical, Magnetic, Radio Frequency, Voice Recognition Systems, An HBJ Publication, Oct. 1986, 2 pages.

SAE Aerospace Standard AS9132, International Aerospace Quality Group (IAQG), Verification Standard, Issued Feb. 2002.

International Standard, ISO/IEC 16022 First Edition May 1, 2000—Reference No. ISO/IEC 16022:2000(E), Information Technology—International Symbology Specification—Data Matrix, May 1, 2000.

Cognex Corporation, Implementing Direct Part Mark Identification: 10 Important Considerations, ID Products, 2004, 1-12.

Rolls-Royce, Direct Part Marking, Implementation Guide, Issue 1—Vcom 9897, Jun. 2004.

Stevenson, Rick, "Laser Marking Matrix Codes on PCBS", Printed Circuit Design & Manufacture, Dec. 2005, pp. 32, 34, 36.

Taniguchi, et al., A Distributed-Memory Multi-Thread Multiprocessor Architecture for Computer Vision and Image Processing: Optimized Version of AMP, System Sciences, Los Alamitos, CA, 1993, 151-160.

Wittenburg, et al., A Multithreaded Architecture Approach to Parallel DSP's for High Performance Image Processing Applications, Signal Processing Systems, Piscataway, NJ, 1999, pp. 241-250.

* cited by examiner

METHOD AND APPARATUS FOR INDUSTRIAL IDENTIFICATION MARK VERIFICATION

BACKGROUND OF THE INVENTION

Field of the Invention

The present invention relates to methods for verifying identification codes used for part identification. More particularly, the present invention relates to a method of verifying the quality of two-dimensional identification marks placed on the surface of a part or component. The overall grade, and diagnostic information is provided to assess the performance of the process used to place the mark on the part.

Description of the Related Art

Automatic identification of products using bar codes has been broadly implemented throughout industrial operations for many years. Traditionally, bar codes or symbols have been printed on labels placed on product packaging and/or material handling trays or containers. The encoded information on the label can be readily identified using various laser scanner or optical readers. Various business operations have come to rely upon the accuracy and availability of data collected from part traceability resulting from automatic identification.

Recent trends are to extend tracking through the full life of a part so that it can be identified from the beginning of its life to the end. To address full life cycle traceability, manufacturers are marking parts with permanent two-dimensional (2D) codes that are marked directly on the part itself, and automatically identifying the part throughout the manufacturing and supply chain operations. This process is known as Direct Part Mark Identification (DPMI).

DPMI is essential for tracking and traceability in highly complex and sensitive assembly systems, such as aerospace and defense systems, medical devices, and electronic assemblies. DPMI permits manufacturers to use traceability data to create a part history through the manufacturing process for later use in supply change management and repair depots.

Part traceability through DPMI improves quality by ensuring that the appropriate processes are performed in the correct sequence on the right parts. DPMI is essential for "error-proofing" initiatives. In addition to eliminating manual part number data entry errors during production operations, DPMI can also assist in data logging for safety, liability, and warranty issues, and to satisfy regulatory requirement for permanently identifying high-value parts that are subject to theft or counterfeiting.

2D codes are typically used for DPMI applications due to the compact size, inherent error correction capabilities, and the amount of information that can be encoded, in comparison to one-dimensional bar codes. In a DPMI application, a 2D code can be marked on the part using several methods, depending upon the material composition, part application, and environmental conditions. Common methods include dot peening, laser and electrochemical etch.

Despite the fact that industries are increasingly adopting DPMI using 2D codes and advanced marking technologies, high read rate DPMI has been difficult to achieve. A limitation to the widespread implementation of DPMI is the inherent difficulty in reading DPMI codes. DPMI codes can be extremely difficult to read, due to low contrast, variations in part surfaces, and partial damage or obliteration from processing and environmental conditions. The application of machine vision technology to hand-held and fixed-mount DPMI readers is essential for a successful implementation of DPMI.

In order to assure that the DPMI code applied to a part will meet the requirements for achieving the highest read rates, it is highly recommended that a code verification system be implemented at the processing station where the code is applied. Verification of a DPMI code is not only a critical factor for downstream reading performance, but it reduces costs associated with rejected parts due to unreadable codes. If a part loses its identity due to the quality of the mark, then the part can often not be used. A verification system will immediately detect a problem with the marking process, such as poor fixturing, damage to the machine, or incorrect settings during configuration or changeover.

A DPMI code verification system typically includes lighting, optics, an image acquisition system, such as a camera, and code verification software. Several verification standards are in use at the present time, such as the AIMI International Symbology Specification for Data Matrix, and the ISO/IEC 15415 International Standard. However, these specifications require an image of a code that can be successfully decoded. Accordingly, there exists a need for a verification method that provides an effective assessment of DPMI codes with diagnostics that provide useful identification of failure modes that can be applied to codes that cannot be decoded due to poor image quality.

BRIEF SUMMARY OF THE INVENTION

An illustrative embodiment of the present invention provides a method for verifying a DPMI code by analyzing an acquired image of the code after it has been placed or printed on an object. If an attempt to decode the DPMI code is unsuccessful, and therefore precluding the application of verification methods of the prior art, the image is analyzed to first determine if the code can be located in the image. If the code can be located in the image, various aspects of a mark quality are measured using the acquired image.

BRIEF DESCRIPTION OF THE SEVERAL VIEWS OF THE DRAWINGS

These and other features of the present invention will be better understood in view of the following detailed description taken in conjunction with the drawings, in which.

DETAILED DESCRIPTION OF THE INVENTION

Figure 1:
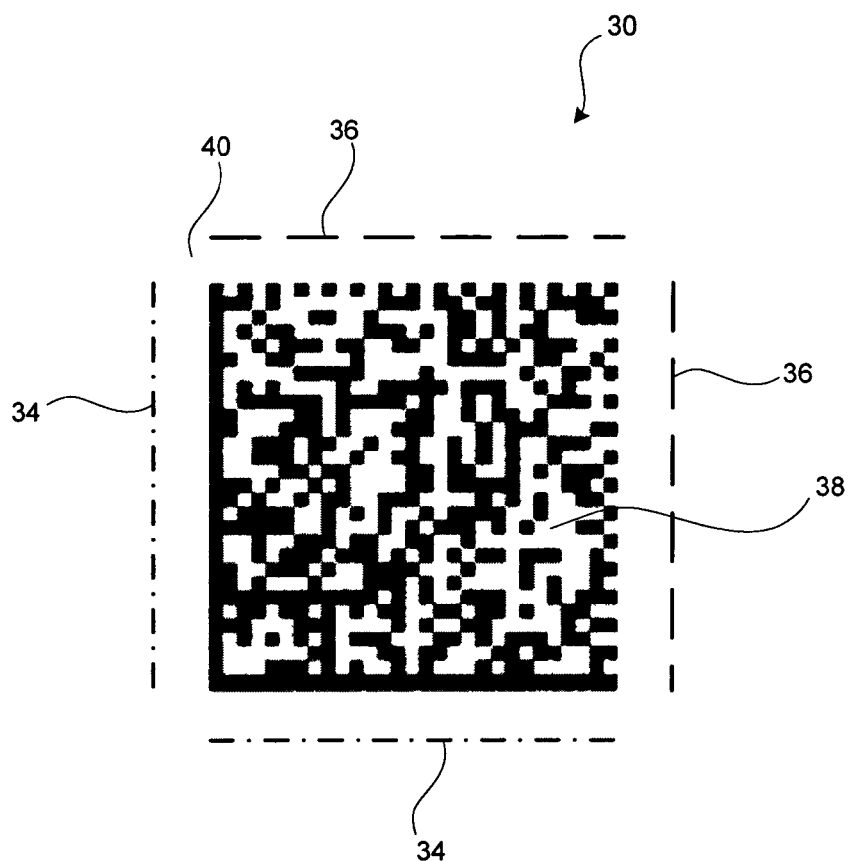
FIG. 1 is a representation of a typical direct part mark identification code.

A DPMI code 30 can be any one of a plurality of industrial standard encoded symbols, or one of a proprietary nature. FIG. 1 depicts a data matrix code 32 according to the ISO/IEC 16022 industry standard, though the methods of the present invention are equally adapted to any type of mark or symbol. The data matrix code 32 is particularly well adapted for use as a DPMI code 30 because of its relatively small, compact size, high data encoding capacity, and inherent error correction. A DPMI code 30 typically consists of a finder pattern 34 and a clocking pattern 36. A quiet zone 40 must be maintained around the periphery of the code. Data cells 38 comprise an array of modules that are contained within the region defined as the code. Though primarily represented as dark modules on a bright background, the code can be inverted according to the code specification.

The quiet zone 40 is a clear area free of all other markings that completely surrounds the code. For a data matrix code 32 that is marked or printed with a continuous finder pattern, such as a printed or etched mark, the quiet zone 40 width should be at least the width of one data cell 38. It is recommended that codes that are placed as a series of dots, such as a peened or ink-jet code, should have a quiet zone 40 equal to the width of at least four data cells 38.

The finder pattern 34 consists of a consistent and unique pattern that forms a portion of each code, regardless of the position of the data cells 38. In a data matrix code 32, the finder pattern consists of two orthogonal lines, known as the "L" pattern. The finder pattern 34 is the key feature used in a code reading algorithm to locate the position of the code in the field of view, thus, a high quality finder pattern 34 is essential to ensure the maximum readability of the code throughout the life cycle of the part.

The clocking pattern 36 are alternating light and dark cells that exist on the perimeter of the code that oppose the finder pattern 34 in a data matrix code 32. The clocking pattern defines the configuration of the pattern of light and dark cells that make up the data region 38 of the code.

Full life cycle traceability requires a permanent marking method, which means that the mark must last for the expected life of the item in the expected environment of its use. The primary marking methods used to place a DPMI code 30 on an object 12 include dot peening, laser marking, chemical etching, and ink jet printing. Though the marking method and code type is a design specification that considers the requirements of the part and the expected operating environment, it is imperative that the marking operation create the DPMI code 30 on the object 12 in such a manner that subsequent reading operations can read and decode the mark.

Figure 2:
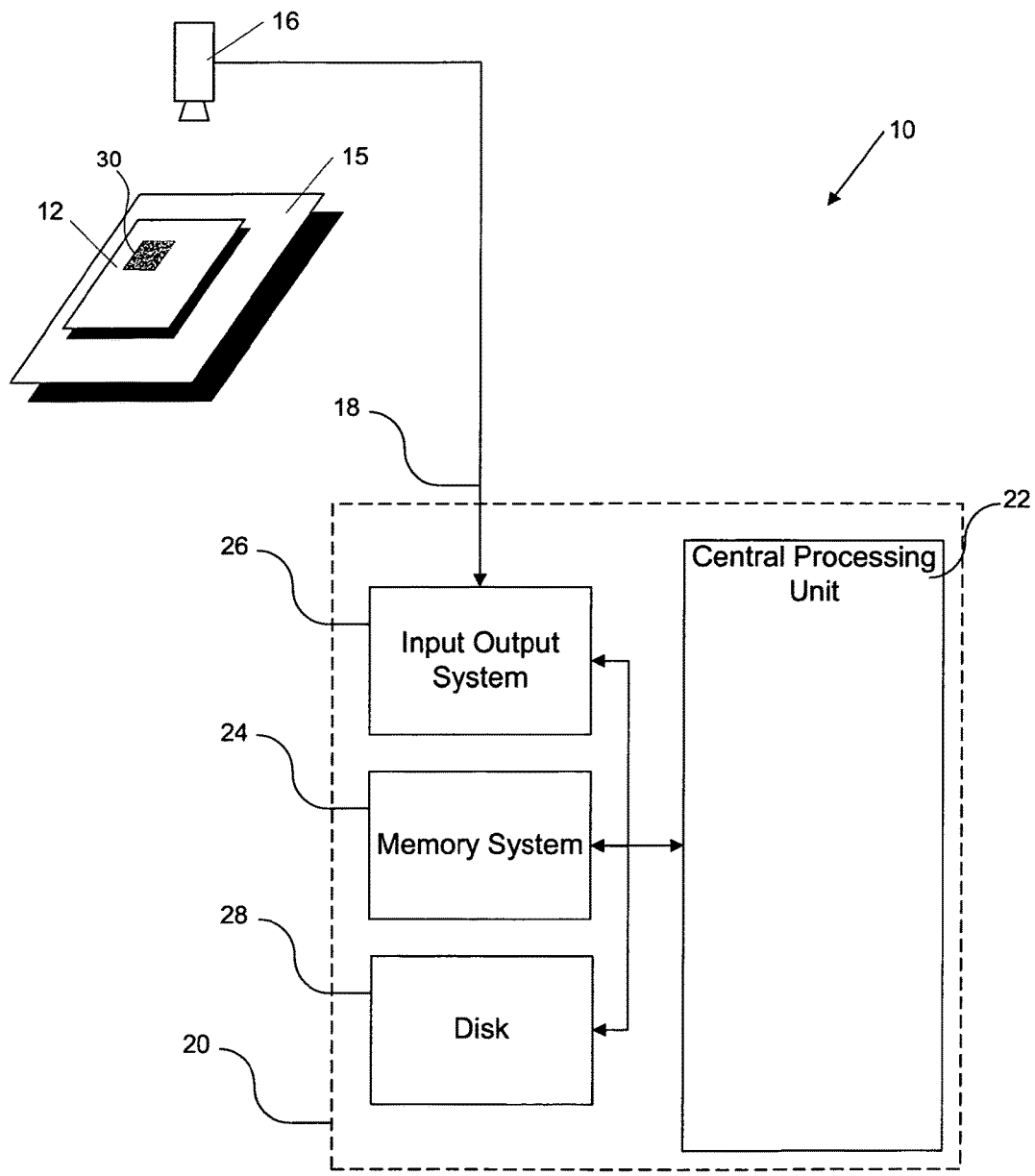
FIG. 2 is a schematic representation of the inspection system according to the present invention.

DPMI code verification is a processing step performed to assess and monitor the process of marking parts, that can be performed using the system 10. shown in FIG. 2. The verification system 10 includes a camera 16 that captures a two-dimensional image of an object 12 bearing a DPMI code 30. The camera 16 can be a charge coupled device (CCD) camera or conventional image acquisition device, such as a complimentary metal oxide semiconductor (CMOS) camera. Digital image data (or pixels) generated by the camera 16 represent, in the conventional manner, the image color/greyscale and/or intensity of each point in the field of view of that capture device—here, a field of view that includes the DPMI code 30 and, optionally, aspects of the article 12 (e.g., package, manufactured good, semiconductor wafer, or so forth) on which it is placed. Optionally, the DPMI code verification processing step can be performed using a hand held reader that integrates the basic functions shown in FIG. 2.

Consistent and uniform illumination is critical in the verification of a DPMI code. System 10 has an illuminator 15 to flood the object 12 with the appropriate type of illumination so that a high contrast image of the DPMI code 30 can be obtained. In an illustrative embodiment of the invention, the illuminator 15 provides multiple modes of illumination, including on-axis bright field illumination, low angle dark field illumination, and diffuse illumination. The mode of illumination that is provided by the illuminator 15 may depend on the marking method used to place the DPMI code 30 on the object 12. For example, dot peened codes have been shown to be well imaged under low angle dark field illumination or diffuse illumination, while ink-jet printed codes on non-specular surfaces have been shown to be well imaged under on-axis bright field illumination.

Digital image data is transmitted from the camera 16 via a communications path 18 to the image analysis system 20. This can be a conventional digital data processor, or a vision processing system of the type commercially available from the assignee hereof, Cognex Corporation, as programmed in accord with the teachings hereof for verification of DPMI images acquired by the camera 16. The image analysis system 20 may have one or more central processing units 22, main memory 24, input-output system 26, and disk drive (or other mass storage device) 28, all of the conventional type.

Figure 3:
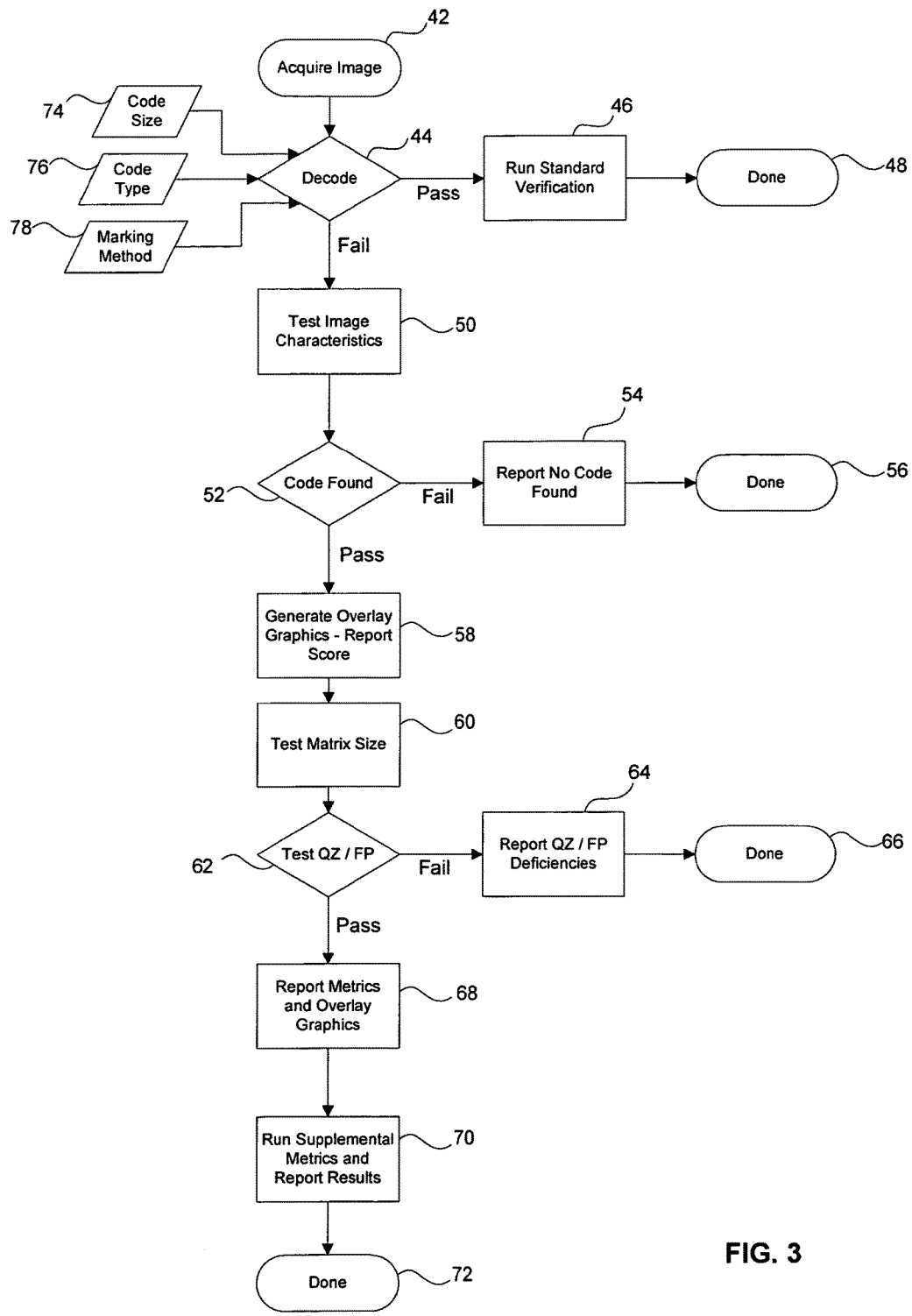
FIG. 3 is a flowchart depicting the methods of the present invention.

FIG. 3 depicts a methodology for DPMI code verification in accord with the practice of the present invention. In step 42, an image of a DPMI code to be verified is acquired. Characteristics of the code will be known, including the code size 74 (e.g., 10×10, 48×48, etc.), the code type 76 (e.g., data matrix, QR, etc.), and the marking method 78 (e.g., dot peen, electro-chemical etch, etc.). As noted above this is a 2D image of the type generated by a CCD camera, or other conventional image acquisition device. For purposes of the discussion that follow, the image is assumed to be of a single DPMI code to be analyzed. In practice, such a DPMI code may occupy only a portion of an actual image acquired by the camera 16, in which case windowing or other appropriate pre-processing is executed in order that the processing performed in the steps describe below may be applied to a single such DPMI code image at a time.

In step 44, a method according to the invention attempts to decode the subject DPMI code image. This step is performed in the conventional manner known in the art and involves an application of machine vision tools to locate and identify the individual bars, dots, or other symbols that make up the machine readable portions of the DPMI code and/or the patterns formed thereby, and to discern from the relative position, size, orientation and/or shape thereof the underlying data. In an illustrative embodiment, the steps to decode at step 44 can be found in the reference decode algorithm published by the standards authority that governs the uniformity for which such codes are deployed. For example, the reference decode algorithm for data matrix symbols can be found in International Standard ISO/IEC 16022 Information Technology—International Symbology Specification—Data Matrix (First Edition 2000-05-01), incorporated herein by reference.

The output of the decode step 44 is true or false depending upon the success of the decode algorithm. If the decode step 44 is successful, then standard verification tests can be applied at step 46, and the verification process is completed at step 48. Standard verification tests applied at step 46 depend on the industrial application, type of mark, and the marking method used. For example, data matrix DPMI codes printed with square cells (i.e., paper-based labels or laser marked codes) are verified using the standard verification tests recommended in the above-referenced ISO/IEC 16022 standard. These tests measure print contrast, modulation axial non-uniformity, and unused error correction to grade marks on a letter scale of A through F, where A is excellent and F is fail.

Data matrix DPMI codes that are produced by dot peening or ink-jet printing are best verified at step 46 using the International Aerospace Quality Group (IAQG) Verification standard (SAE Aerospace Standard AS9132, 2002-02, incorporated herein by reference). This standard measures dot size, dot position, and dot ovality to give each mark a grade of A, B, or F, which indicates whether a mark is excellent, acceptable, or fails, respectively. Additionally, each dot is analyzed and assigned a grade, and the overall quality of a DPMI code is the lowest grade achieved by any of the tests.

Regardless of the standard used for the standard verification tests at step 46, a prerequisite of these tests is that the DPMI code be successfully decoded. In the method according to the present invention, successful decoding is not a requirement, since useful information can be provided from verification tests to evaluate and analyze a DPMI marking operation without attaining a successful decode at step 44.

If the output of the decode step 44 is not successful, then processing continues where image characteristics are tested at step 50. Image characteristic tests can include image sharpness, image brightness, and contrast—characteristics that can provide an assessment of an image without requiring an evaluation of the content of the image.

To evaluate the sharpness of the image as a test of image characteristics at step 50, the edge magnitudes of the image are derived. Convolving the image with an edge detection kernel, such as the 3×3 Sobel filter provides a list of edge direction and edge magnitudes for edgelets associated with features in the image. A sharpness score can be computed as:

$$S_{sharpness} = \min\left(1, \frac{mEdgeLight}{mLight - mDark}\right).$$

Where mEdgeLight is the average magnitude of the 10% strongest edge in the image, including the quiet zone; mLight is the average gray level of the 10% lightest pixels in the symbol image including the required quiet zone; and mDark is the average gray level of the 10% darkest pixels in the symbol image including the required quiet zone.

The image sharpness score will compute to be a value ranging between 0 and 1 inclusively. An ideal DPMI code image with a clear background and sufficient background separation has an image sharpness value of 1, while a blurred image has a lower image sharpness value.

An evaluation of the brightness, contrast, and saturation of the image can be tested as the image characteristics tested at step 50. Brightness is a measurement of the overall intensity of the image. Contrast is a measurement of the difference between the intensity of the brightest features in the image and the intensity of the darkest features. Poor contrast will be observed in images that are too bright and washed out, and in images that are too dark. These tests can indicate problems with the image formation system—i.e., the illumination from the illuminator 15 and/or incorrect parameters in the settings for the camera 16.

Step 52 performs a test to determine if the DPMI code can be found in the image. The code "finding" test can be the portion of the decoding algorithm that is performed to locate the finder pattern in the image that can precede the step of decoding. Such an algorithm can be found in the reference decoding algorithm of the code type under analysis. For example, in the case of a data matrix DPMI code, the reference decoding algorithm can be found in the above referenced ISO/IEC 16022 standard. The reference decode algorithm for the data matrix code provides a sequence of operations to first locate the "L pattern" and then build expanding search lines to determine the extent of the code to find the clocking pattern.

Alternatively, the test for "finding" the code in the image can be performed during the decode attempt at step 44, by setting a "code found" variable to indicate that the code was located in the image. The result of the test to determine if the DPMI code was found in the image will include a score, or confidence value that the code was found.

If the output of the code location step 52 indicates that the code was not found, processing continues to step 54 that reports the code location failure, and the output of the image characteristics test at step 50. Processing concludes at step 56.

If the output of the code location step 52 indicates that the code was found, then processing continues to step 58 to generate overlay graphics, and to report the score from the code location step 52. Overlay graphics can highlight the portion of the image that can be associated with the finder pattern and the clocking pattern.

Processing continues to step 60 where the matrix size is determined and compared to the expected value, to measure an aspect of mark quality. The clocking pattern 36 that was derived in the code location step 52 will determine the size of a cell module 38, upon which the overall matrix size can be derived.

Processing continues at step 62 where the quiet zone and finder patterns are tested to measure an aspect of mark quality. At this step, a reflectance threshold is derived from a histogram of the image 42. In the illustrative embodiment, the acquired image 42 is smoothed with a 3×3 median filter.

The finder pattern tests performed at step 62 are determined by the code type 76 and marking method 78. For DPMI codes that have a continuous features (i.e., code types that have a continuous pattern, that is marked in a continuous printing method, such as laser or electro-chemical etch), a finder pattern test can evaluate the conformity of each module of the finder pattern. For example, in a data matrix code, as described above, the finder pattern 34 is an "L pattern" on one half of the code. This type of finder pattern is constructed from a series of continuous modules, each of the same size as the data modules 38. In an illustrative embodiment, the finder pattern test performed at step 62 can be calculated as:

$$S_{finder} = \frac{N_{aD}}{N_{nD}} \times \frac{N_{aL}}{N_{nL}} \times \frac{N_d}{N_l}$$

where $N_{aD}$ is the actual number of dark modules among the modules ought to be dark (gray value less than the reflectance threshold) in the finder patterns. $N_{nD}$ is the number of modules ought to be dark (gray value less than the reflectance threshold) in the finder pattern. $N_{aL}$ is the actual number of light modules among the modules ought to be light (gray value greater than the reflectance threshold) in the finder pattern. $N_{nL}$ is the number of modules that ought to be light in the finder pattern. $N_d$ is the number of dark pixel (gray value less than the reflectance threshold) in the solid lines of the finder pattern. $N_l$ is the number of light pixel (gray value greater than the reflectance threshold) in the solid lines of the finder pattern.

For DPMI codes that have a discontinuous finder pattern 34, such as those made in a marking method 78 such as dot peened, or dot matrix printed methods, a different finder pattern test can be applied. Here, the individual cells of the "L pattern" of the symbol are likely to be disconnected from each other, and a measure of finder pattern conformity can be calculated as:

$$S_{finder} = \frac{N_{aD}}{N_{nD}} \times \frac{N_{aL}}{N_{nL}}$$

where $N_{aD}$ is the actual number of dark modules among the modules ought to be dark (gray value less than the reflectance threshold) in the finder patterns. $N_{nD}$ is the number of modules ought to be dark (gray value less than the reflectance threshold) in the finder pattern. $N_{aL}$ is the actual number of light modules among the modules ought to be light (gray value greater than the reflectance threshold) in the finder pattern. $N_{nL}$ is the number of modules that ought to be light in the finder pattern.

The quiet zone tests performed at step 62 evaluate the region defined as the quiet zone of the symbol located in the image. The quiet zone is typically defined as a region that must be free of all other markings surrounding the symbol on all sides, and for data matrix DPMI codes, the width of this region is at least one data cell width, and wider for other codes, such as the QR code. For DPMI codes, this requirement can be failed if the mark is placed on the part where a surface aberration or defect is present. The features that exist on the surface of the part can result in a quiet zone failure. To evaluate the quiet zone, a histogram analysis can be performed that compares the distribution of gray-level intensities of the image to the distribution of gray-level intensities of the quiet zone. A bimodal distribution is expected for the histogram of the image, while a single mode of light pixels is expected for a conforming quiet zone (if the symbol is dark-on-light; the quiet zone distribution will be a single mode of dark pixels if the symbol is light on dark).

If the tests of the quiet zone and finder pattern result in failures, processing continues to step 64 where the quiet zone and finder pattern deficiencies are reported, to conclude at step 66. If the quiet zone and finder pattern pass the tests at step 62, processing continues to step 68 where the quiet zone and finder pattern test results are reported, with overlay graphics to indicate the location of the finder pattern and quiet zone in the image.

At step 70, supplemental metrics are computed and reported to provide diagnostic information for code verification to measure an aspect of mark quality. At this point, more than likely the reason the code was not able to be decoded at step 44 is that the image under analysis exhibits deficiencies or defects in the data cells 38. Supplemental metrics at step 70 can provide further information that can provide guidance as to the condition of the code.

Supplemental metrics at step 70 can include a symbol separability test to verify that the predominate feature of the image is the symbol. To perform a symbol separability test, a comparison is performed between a histogram of the entire image and a histogram of the portion of the image where the symbol was located at step 52. Assuming that $m_0$ is the mean value of the dark pixels in the symbol, $m_1$ is the mean value of the light pixels in the symbol, and T is the reflectance threshold obtained from the histogram of the entire image, the symbol separability test is deemed passed if:

$$m_0 < T < m_1$$

Supplemental metrics at step 70 can include a module separability test that evaluates the bi-modality characteristic of the data cells 38, that represent binary data bit 1 or 0. Since each DPMI code type 76 contains a data region that contain nominally square modules set out in a regular array, each module can be represented by the average gray value of pixels within the module. In the ideal case, the histogram of the module representation has two well-separated narrow peaks, corresponding to the two states of the modules. The separability of the data cells 38 is defined as:

$$S_m = \left(1 - \frac{\sum_{g=A}^{B} h(g)}{\sum_{g=0}^{255} h(g)}\right) \times \max\left\{0, 1 - \frac{sLight + sDark}{mLight - mDark}\right\} \text{ if } mLight \neq mDark$$

$S_m = 0$ if $mLight = mDark$

Where g is the index of gray level, h(g) is the number of modules where the center has a gray level g; T is the threshold obtained from the histogram of the module representations; sLight is the standard deviation of light modules; sDark is the standard deviation of dark modules; mLight is the mean of light modules; mDark is the mean of dark modules; and $A = m\text{Dark} + (T - m\text{Dark}) \times 0.15$ $B = m\text{Light} - (m\text{Light} - T) \times 0.15$ The value of $S_m$ ranges from 0 to 1 inclusively. A value of 0 indicates significant overlapping between the dark and light modules, which can result in a learn/decode failure. A value closer to 1 indicates good separability, and thus, good readability of the symbol.

One skilled in the art will appreciate that further supplemental tests can be performed at step 70 that may include various code type-specific tests or evaluations. Additionally, aspects of mark quality can be measured at step 70 through the application of any combination of standard verification tests, recommended in the above-referenced ISO/IEC 16022 standard. These tests can include measurement of print contrast, modulation axial non-uniformity, to the extent that such tests can be computed without the results of a successful decode at step 44. Processing concludes at step 72.

Although the invention is shown and described with respect to an illustrative embodiment thereof, it should be appreciated that the foregoing and various other changes, omissions, and additions in the form and detail thereof could be implemented without changing the underlying invention.

What is claimed is:
1. A computer-implemented method for verifying a direct part mark inspection code, the method comprising:
  acquiring an image of the code;
  attempting, using one or more processing devices, to decode the code using the image; and
  if the attempt to decode the code is unsuccessful:
    locating the code, using the one or more processing devices, in the image to provide a code location; and
    measuring, using the one or more processing devices, aspects of a mark quality using the image and the code location in the image;
  wherein the step of measuring the aspects of the mark quality includes one of more of:
    calculating a quality of a continuous finder pattern based on one or more of a ratio of actual to expected dark modules in the continuous finder pattern, a ratio of actual to expected light modules in the continuous finder pattern, and a ratio of dark to light pixels in solid lines of the continuous finder pattern;
    calculating a quality of a discontinuous finder pattern based on one or more of a ratio of actual to expected dark modules in the discontinuous finder pattern, and a ratio of actual to expected light modules in the discontinuous finder pattern; and performing a histogram analysis on a quiet zone in the image.

2. The method according to claim 1 wherein the step of measuring aspects of a mark quality includes the step of performing the histogram analysis on the quiet zone, and at least one of the step of calculating the quality of the continuous finder pattern and the step of calculating the quality of the discontinuous finder pattern.

3. The method according to claim 1 wherein the step of measuring aspects of a mark quality further comprises one or more of evaluating a clocking pattern of the code in the image and evaluating a matrix size of the code in the image.

4. The method according to claim 1, further comprising, after the step of measuring the aspects of the mark quality, generating an overlay graphic in the acquired image to visually highlight a portion of the image associated with the measured aspects of the mark quality.

5. The method according to claim 1, further comprising, if the attempt to decode the code is unsuccessful, computing an image sharpness score based on identifying edge direction and edge magnitudes for edgelets associated with features in the image.

6. The method according to claim 1 further comprising, if the step of measuring the aspects of the mark quality indicates a pass result for the quiet zone and at least one of the continuous finder pattern and the discontinuous finder pattern, evaluating a supplemental metric that includes one or more of a symbol separability test and a module separability test.

7. The method according to claim 1 wherein the step of calculating the quality of the continuous finder pattern includes calculating a multiplication product of the ratio of actual to expected dark modules in the continuous finder pattern, the ratio of actual to expected light modules in the continuous finder pattern, and the ratio of dark to light pixels in solid lines of the continuous finder pattern.

8. The method according to claim 1 wherein the step of calculating the quality of the discontinuous finder pattern includes calculating a multiplication product of the ratio of actual to expected dark modules in the discontinuous finder pattern and the ratio of actual to expected light modules in the discontinuous finder pattern.

9. The method according to claim 1, further comprising reporting an image deficiency if the histogram analysis of the quiet zone does not indicate a bimodal distribution.

10. A method for verifying a direct part mark inspection code, the method comprising:
  acquiring an image of the code;
  attempting to locate the code in the image;
  attempting to decode the code using the image;
  at least one of generating an overlay graphics to highlight a portion of a location of the code and reporting a confidence value for the location of the code; and
  measuring at least one aspect of a mark quality using the image of the code, if the attempt to decode the code is unsuccessful;
  wherein the step of measuring the at least one aspect of the mark quality includes calculating a quality of a finder pattern based on identifying one or more of:
    a quantity of actual dark modules and a quantity of expected dark modules for the finder pattern;
    a quantity of actual light modules and a quantity of expected light modules for the finder pattern; and
    a quantity of dark pixels and a quantity of light pixels in solid lines of the finder pattern.

11. The method according to claim 10, further comprising generating a second overlay graphic in the acquired image to visually highlight a portion of the image associated with the measured at least one aspect of the mark quality.

12. The method according to claim 10 wherein the step of measuring at least one aspect of a mark quality comprises evaluating one or more of a clocking pattern of the code in the image and a matrix size of the code in the image.

13. The method according to claim 10 wherein the step of calculating the quality of the finder pattern includes deriving a reflectance threshold from a histogram of the image and identifying one or more of the actual dark modules or one or more of the actual light modules using the reflectance threshold.

14. The method according to claim 13, wherein the step of calculating the quality of the finder pattern further includes calculating a multiplication product of two or more of a ratio of the quantity of actual dark modules to the quantity of expected dark modules, a ratio of the quantity of actual light modules to the quantity of expected light modules, and a ratio of the quantity of dark pixels to the quantity of light pixels.

15. The method according to claim 10 wherein the step of measuring at least one aspect of a mark quality comprises evaluating a symbol separability test.

16. The method according to claim 10 wherein the step of measuring at least one aspect of a mark quality comprises evaluating a module separability test.

17. An apparatus for verifying a direct part mark inspection code, the apparatus comprising:
  means for acquiring an image of the code;
  means for attempting to decode the code using the image;
  means for locating the code in the image if the attempt to decode the code is unsuccessful to provide a code location;
  means for computing an image sharpness score based on identifying edge directions and edge magnitudes for edgelets associated with features in the image, if the attempt to decode the code is unsuccessful;
  means for measuring at least one aspect of a mark quality using the image and the code location, if the attempt to decode the code is unsuccessful and the code location is provided, wherein the means for measuring the at least one aspect of the mark quality includes means for one or more of:
  calculating a quality of a finder pattern based on identifying two or more of:
    a quantity of actual dark modules and a quantity of expected dark modules for the finder pattern;
    a quantity of actual light modules and a quantity of expected light modules for the finder pattern; and
    a quantity of dark pixels and a quantity of light pixels in solid lines of the finder pattern; and
  performing a histogram analysis on a quiet zone in the image; and
  means for reporting a deficiency in one or more of the finder pattern and the quiet zone based on the measuring of the at least one aspect of the mark quality.

18. The apparatus of claim 17, wherein the finder pattern is a continuous finder pattern; and
  wherein the means for calculating the quality of the finder pattern include means for calculating a multiplication product of a ratio of the quantities of actual dark modules and expected dark modules and a ratio of the quantities of actual light modules and expected light modules.

19. The apparatus of claim 17, wherein the finder pattern is a discontinuous finder pattern; and wherein the means for calculating the quality of the finder pattern include means for calculating a multiplication product of a ratio of the quantities of actual dark modules and expected dark modules, a ratio of the quantities of actual light modules and expected light modules, and a ratio of the quantities of dark pixels and light pixels.

20. The apparatus of claim 17, wherein the image sharpness score is computed based on determining a minimum value of: the numerical value of one, and a ratio of an average magnitude of a 10% strongest edge in the image to a difference between an average gray level of a set of 10% lightest pixels in the image and an average gray level of a set of 10% darkest pixels in the image.

* * * * *